United States Patent [19]

Mosman

[11] Patent Number: 4,977,684

[45] Date of Patent: Dec. 18, 1990

[54] APPARATUS AND METHOD FOR MEASURING LENGTH WITH A TAPE AND A RULE

[76] Inventor: Loren Mosman, 1235 SW. Second St., Wadena, Minn. 56482

[21] Appl. No.: 290,764

[22] Filed: Dec. 27, 1988

[51] Int. Cl.$^5$ .............................. G01B 3/10; G01B 3/06
[52] U.S. Cl. ........................................ 33/766; 33/761; 33/764
[58] Field of Search ................. 33/761, 764, 765, 766, 33/767, 768, 769, 809, 810, 494, 484, 770

[56] References Cited

U.S. PATENT DOCUMENTS

| 2,240,753 | 5/1941 | Bouchard et al. | 33/764 |
| 2,684,534 | 7/1954 | Ljungberg | 33/766 |
| 3,181,242 | 5/1965 | Cook | 33/761 |
| 3,376,648 | 4/1968 | Ljungberg | 33/766 |
| 4,547,969 | 10/1985 | Haack | 33/770 |

FOREIGN PATENT DOCUMENTS

| 0198806 | 10/1986 | European Pat. Off. | 33/767 |
| 1912735 | 10/1970 | Fed. Rep. of Germany | 33/761 |
| 0113424 | 2/1918 | United Kingdom | 33/761 |
| 0823340 | 11/1959 | United Kingdom | 33/765 |

Primary Examiner—William A. Cuchlinski, Jr.
Assistant Examiner—Christopher W. Fulton
Attorney, Agent, or Firm—Henry C. Kovar

[57] ABSTRACT

A device and a method for measuring linear lengths has a tape housing, a flexible measuring tape, and a rigid rule movably fastened to the housing. The rule can by itself accurately and directly measure relatively small structures and the tape and rule are preferably deployed in opposition to each other to obtain inside measurement results by combining the length of the rule and the deployed length of tape. Angles between the housing and the rule can also be determined or transferred.

10 Claims, 2 Drawing Sheets

APPARATUS AND METHOD FOR MEASURING LENGTH WITH A TAPE AND A RULE

BACKGROUND OF THE INVENTION

1. This invention pertains to an apparatus and a method of measuring length using both a flexible tape and a rigid rule fastened to a single housing; the measurement result may include the effective length of both the rule and the tape and is especially effective for measuring recess dimensions.

2. THE PRIOR ART

It has been exceedingly difficult to accurately measure small liner dimensions with tape measures. The L-shape nose piece on a typical tape is fastened to the tape with afore-aft clearance to negate the thickness of the nose stop, and the nose stop gets bent in and/or out. Accurate measurement is not reliable. It has also been difficult to measure inside of slots, grooves, rabbits, T-slots, dove-tails, dados and the like. Measuring a recess is difficult with a tape measure. As a specific example, measuring for sliding covers in bread drawers, measuring for drawer widths, and measuring for the size of glass panes in windows are all exceedingly difficult.

The closest known prior patent art is B. P. Haack U.S. Pat. No. 4,547,989 which has both a flexible tape and a rigid rule on single housing, but which does not provide for using the length of both the tape and the rule to obtain a measurement of length between outer ends of the tape and the rule.

OBJECTS OF THE INVENTION

It is an object of this invention to provide a single measuring device with both a tape and a rigid rule, for accurate measurement for both relatively large and small lengths.

It is an object of this invention to provide a measuring device and method having and/or using both a tape and a rigid rule, wherein the length of both tape and rule may be easily utilized together for obtaining a measurement of length.

It is an object of this invention to provide a tape measure having a rigid rule normally stored and protected by the tape measure housing.

SUMMARY OF THE INVENTION

A linear measuring device has a tape housing, a flexible measuring tape, a rigid rule movably secured to the housing, and rule storing structure in the housing for normally storing the entire length of the rule upon the housing perimeter.

A linear measuring device has a tape housing, a flexible measuring tape inside the housing, a rigid rule having one end fastened by a hinge to the housing, and structure for holding the rule in either a storage or a use position.

A method of measuring length has the steps of pulling a flexible measuring tape from a housing, displaying a rigid rule from the housing, abutting both the tape and the rule against a structure to be measured, and utilizing the length of both the tape and the rule to obtain a measurement result.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

DESCRIPTION OF THE PREFERRED EMBODIMENT

Figure 1:
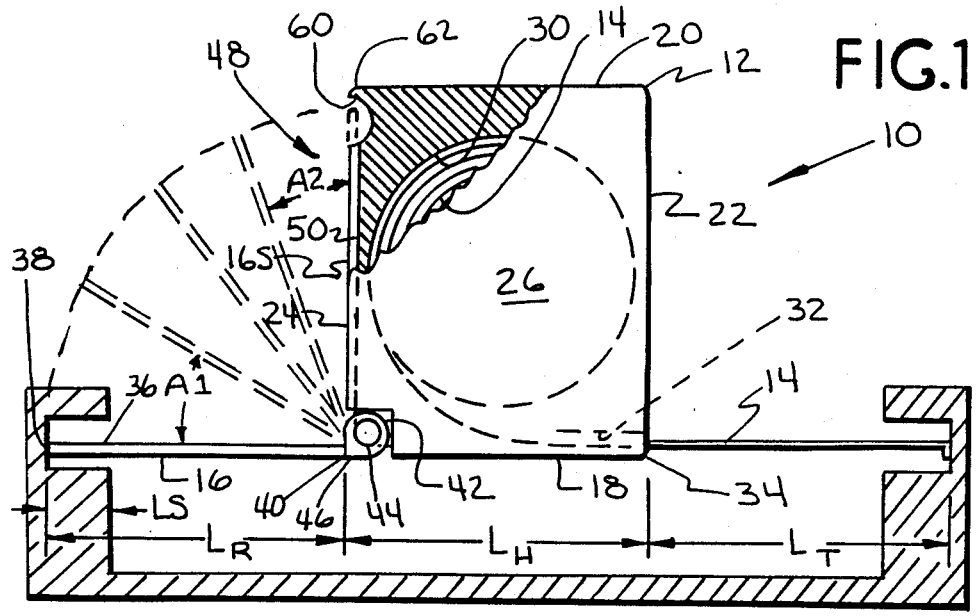
FIG. 1 is an elevational end view of the preferred embodiment of a measuring device according to the present invention, being shown in use.

A measuring device is shown in FIGS. 1-6 and generally indicated by the numeral 10; the device 10 has a housing 12, a flexible measuring tape 14; and a rigid measuring rule 16.

Figure 2:
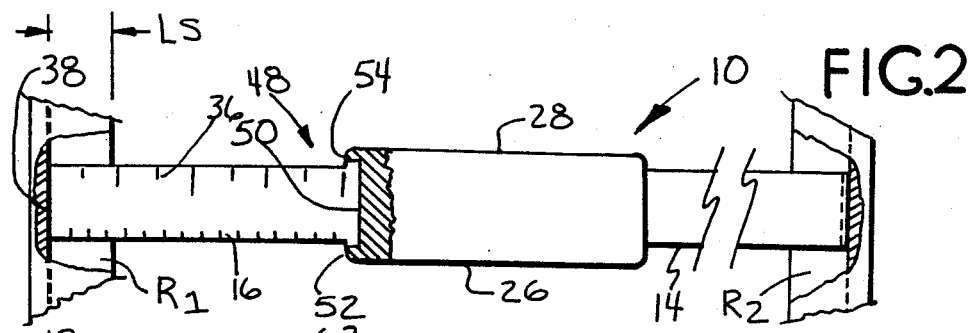
FIG. 2 is a top plan view of the device of FIG. 1.
Figures 3, 4, 5:
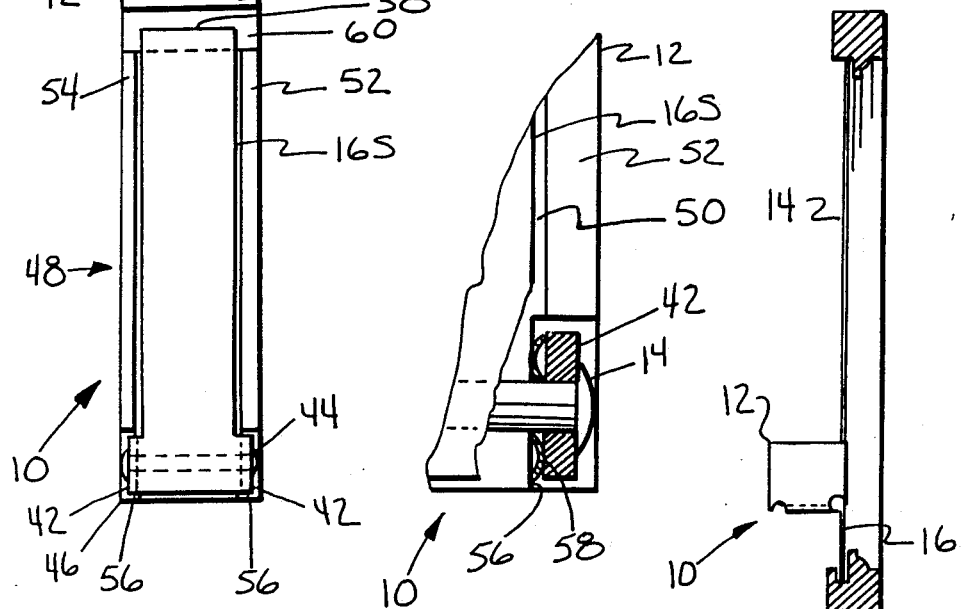
FIG. 3 is an elevational end view of the device of FIG. 1.
FIG. 4 is a detail of the device of FIG. 1.
FIG. 5 is an elevational view of the device of FIG. 1 in an alternative use.
Figure 6:
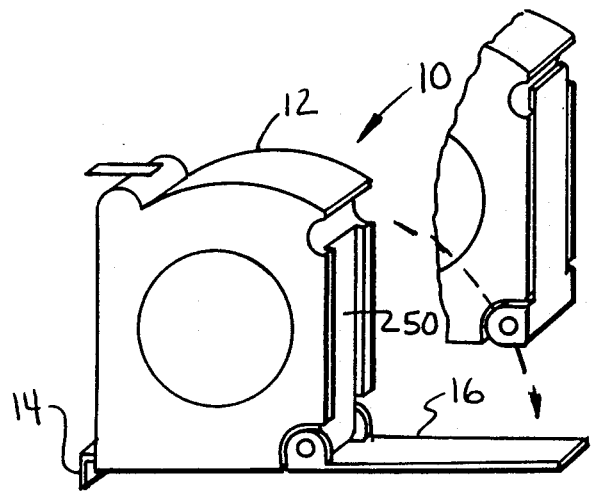
FIG. 6 is a perspective view of the device of FIG. 1.

The housing 12 has a base side 18, a top side, 20 a first opposed side 22 and a second opposed side 24. The opposed sides 22, 24 are perpendicular to the base side 18 and spaced a nominal and accurate distance from each other; i.e. an exact two inches, three inches or other such specific dimension so that the distance between the opposed sides 22,24 can be easily utilized together with the extended and deployed length of the tape 14 for measuring. The thickness of the housing 12 is defined by the distance between the opposed housing side panels 26, 28 as best seen in FIGS. 2 & 3. A perimeter of the housing 12 is defined by the maximum extent of the four sides, 18, 20, 22, 24. The tape 14 is normally stored as a coil inside a tape storage chamber 30 inside of the housing 12.

The tape 14 is deployable in and out of a tape outlet 32 in a base corner 34 of the first side 22.

The rigid rule 16 has a scaled elongate body 36, a distal outboard end 38, and an inboard end 40 which is movably fastened to the housing 12. The rule inboard end 40 preferably has a clevis 42 which is pivotally fastened by a fulcrum pin or shaft 44 in and to a base corner 46 to the second housing side 24. The normal storage position of the rule 16 is shown and designated as 16S in both FIGS. 1 & 3 wherein the rule body 36 is protectively stored within the perimeter of the housing 12 and in rule storage structure, generally indicated by the numeral 48, in the second opposed housing side 24. The storage structure 48 has a recessed rule 16 receiving channel 50 in-between a pair of spaced apart perimeter ribs 52, 54. The channel 50 has a depth which is greater than the thickness of the rule body 36. The width of the rule body 36 slip fits in-between the ribs 52, 54. The clevis 42 has an overall width that is less than the thickness of the housing 12, and the clevis is fitted into a pair of recesses 56 in the base corner 46 of the second opposed side 24. A friction washer or appropriate friction mechanism 58 is operatively fitted inbetween the housing 12 and the rule 16 and is operative to frictionally hold the rule in either the storage position 16S or the deployed use position 16, or in alternative non-normal positions as shown in dotted line in FIG. 1. The deployed length LR of the rule body 36 as best seen in FIG. 1 is preferably identical to the housing length LH.

A rule access structure 60 is provided at the top corner 62 of the second opposed housing side 24. The access structure 60 is diagonally opposite to the tap opening 32. The rule storage structure 48 is disposed in-between the access structure 60 and the clevis recesses 56.

In the practice of the method of the present invention and in the use of the device 10 for measuring a linear length, the rule 16 is accessed via the access structure 60 and opened from the storage position 16S to the alternative deployed use position which is at least 90 degrees to the tape 14, and preferably 180 degrees directly opposite to and co-planar with the deployed tape 14 as best seen in FIGS. 1 and 4. The device 10 with the deployed rule 16 is then placed into the object to be measured, such as a drawer as shown in FIG. 1 and a window frame as shown in FIG. 5. The rule outboard end 38 is abutted against the bottom of the recess R1 and the tape 14 is extended across to the far relevant feature to be measured. The relatively small depth LS of the recess R1 can be read directly and accurately on the rule body 36 and the span across is a measurement result obtained by summing LR+LH+LT. The values LR+LH are preferably identical at two inches, three inches or some such nominal amount, and the summed result is easy to add-up by the user of the device 10.

Angles A1 and A2 can also measured and/or determined for transfer as seen in FIG. 1 by holding the device 10 in proximity to a work object and then to a protractor or vice-versa.

Figure 7:
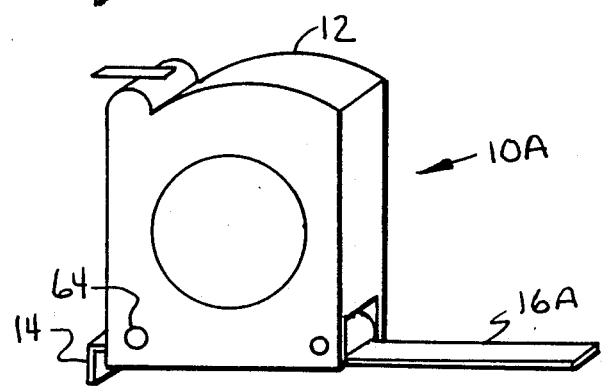
FIG. 7 is an alternative embodiment of the present invention.

FIG. 7 shows an alternative rule 16A hinged so that it can swing out 180 degrees from the housing 12A, and a push-button rule release 64.

Figure 8:
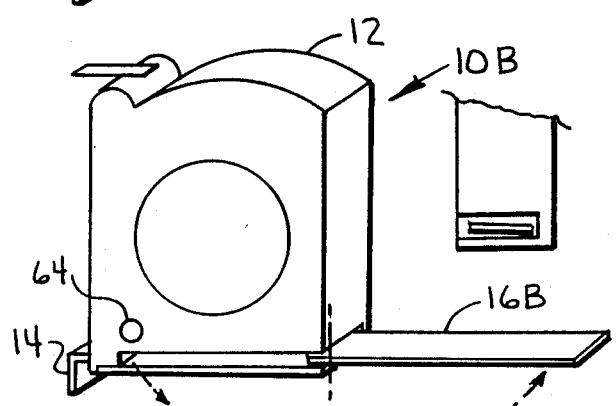
FIG. 8 is a second alternative embodiment of the present invention.

FIG. 8 shows an alternative transversely swinging rule 16A and a push-button rule release 64.

Figure 9:
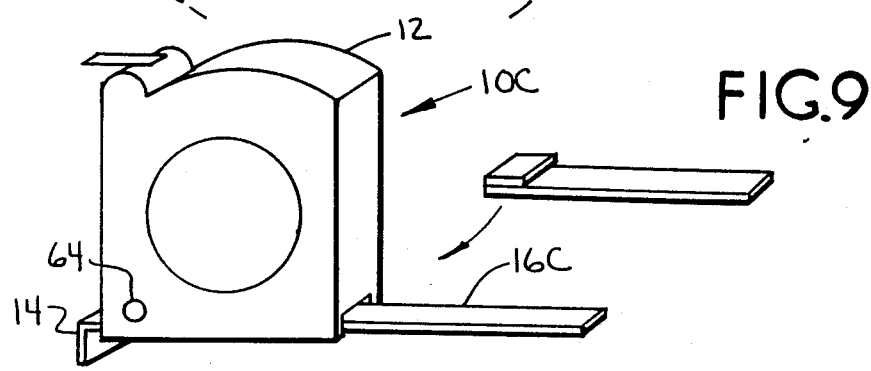
FIG. 9 is a third alternative embodiment of the present invention.

FIG. 9 shows an alternative sliding rule 16A and a push-button rule release 64.

This device 10 and method are extremely useful for both small and large linear measurements, measurements inside of recess, and angle determination and transfer. The cost of the device 10 is modest and its value is relatively high. It is an extremely useful combination of discrete elements that has anew and very useful functional purposes.

Although other advantages may be found and realized and various modifications may be suggested by those versed in the art, it should be understood that I wish to embody within the scope of the patent warranted hereon, all such embodiments as reasonably and properly come within the cope of my contribution to the art.

I claim as may invention:
1. A linear measuring device comprising
   (a) a tape housing having an exterior perimeter with a tape outlet;
   (b) a flexible measuring tape normally stored in a spiral configuration within the housing, said tape being extractable from the housing and returnable into the housing through the tape outlet;
   (c) a rigid rule movably secured to the housing independently of the tape, said rule being deployable in a direction projecting at least 90 degrees divergent from the extracted portion of the flexible tape;
   (d) rule storing means in said housing for normally storing the entire length of said rule compliantly upon said housing perimeter; and in which
      (1) said housing is generally rectangular and has a pair of opposed sides with the said tape outlet being in a first of said opposed sides, said rule storing means being on the second of said opposed sides;
      (2) said tape outlet is on a base corner of said first opposed side, and including a fastener in a base corner of said second side securing said rigid rule to said second side base corner;
      (3) said rigid rule has a deployed length of extension normal to and from said second side which is equal in length to the distance between said base corners; and
      (4) the entire length of the rigid rule nests within one side of the housing.

2. The device of claim 1, including access means in a top corner of said second side for providing access to an outboard end of the rigid rule, for manipulation and opening of the rigid rule.

3. The device of claim 1, including a fulcrum structure pivotally securing one end of the rigid rule to a corner of the housing, and friction means in-between the rule and the housing for frictionally holding the rule in a plurality of angular positions in-between a stored position and a deployed position.

4. A linear measuring device comprising
   (a) a tape housing having an exterior perimeter with a tape outlet;
   (b) a flexible measuring tape normally stored in a spiral configuration within the housing, said tape being extractable from the housing and returnable into the housing through the tape outlet;
   (c) a rigid rule movably secured to the housing independently of the tape, said rule being deployable in a direction projecting at least 90 degrees divergent from the extracted portion of the flexible tape;
   (d) rule storing means in said housing for normally storing the entire length of said rule compliantly upon said housing perimeter; and
   (e) a clevis on one end of the rigid rule, said clevis being fastened by a pin to a housing, said clevis and pin being recessed within and between opposed side panels of the housing.

5. A linear measuring device comprising
   (a) a tape housing having an exterior perimeter with a tape outlet;
   (b) a flexible measuring tape normally stored in a spiral configuration within the housing, said tape being extractable from the housing and returnable into the housing through the tape outlet;
   (c) a rigid rule movably secured to the housing independently of the tape, said rule being deployable in a direction projecting at least 90 degrees divergent from the extracted portion of the flexible tape; and
   (d) rule storing means in said housing for normally storing the entire length of said rule compliantly upon said housing perimeter, in which said rule storing means comprises a pair of opposed elongate protective ribs, one rib being on each outer side of a central recessed channel, said rigid rule being normally stored within the channel.

6. The device of claim 5, including a rule fastener in-between a base of the housing and a base end of the rule storing means, and a rule access structure in-between a top end of the housing and a tope end of the rule storing means.

7. The device of claim 6, in which said rule fastener and said access structure are both contained within the thickness of the housing as defined by opposed side panels of the housing.

8. A linear measuring device comprising
   (a) a tape housing having a generally rectangular exterior perimeter with a base side, a top side, opposed first and second sides generally perpendicular to the base side and extending from the base side to the top side, a tape storage chamber within the housing and a tape outlet at a base corner of said first side;
   (b) a flexible measuring tape normally stored in a coil within the storage chamber, said tape being outwardly deployed through and from the tape outlet in a direction which is generally co-planar with said base side;
   (c) a rigid rule having a housing end with at least one-half of a hinge rotatably secured to a base corner of the second opposed side, said rule being rotatable from a storage position adjacent the housing to a use position generally co-planar with and opposed at 180 degrees from the tape; and
   (d) means for holding said rule in either the storage or the use position, in which the housing has a second and complemented half of said hinge, said hinge being completely contained within the thickness of the housing.

9. The device of claim 8, including rule storage means in said second opposed side for receiving the rule within the perimeter of the housing.

10. The device of claim 9, including means in a top side corner and diagonally opposite from the tape outlet, for accessing and opening the rule from the storage to the use position.

* * * * *